(12) United States Patent
Martin et al.

(10) Patent No.: US 6,791,085 B2
(45) Date of Patent: Sep. 14, 2004

(54) INFRARED RADIATION DETECTION DEVICE

(75) Inventors: Jean-Luc Martin, Saint-Geoire-en-Valdaine (FR); Eric Mottin, Saint-Martin-le-Vinoux (FR); Arnaud Laflaquiere, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 249 days.

(21) Appl. No.: 09/995,051

(22) Filed: Nov. 27, 2001

(65) Prior Publication Data

US 2002/0125432 A1 Sep. 12, 2002

(30) Foreign Application Priority Data

Nov. 30, 2000 (FR) .............................................. 00 15488

(51) Int. Cl.[7] .................................................. G01J 5/00
(52) U.S. Cl. .............................. 250/338.1; 250/339.03; 250/339.04; 250/352
(58) Field of Search .......................... 250/338.1, 338.3, 250/338.4, 339.03, 339.04, 352

(56) References Cited

U.S. PATENT DOCUMENTS

| 4,336,452 A | * | 6/1982 | Baker ...................... 250/338.3 |
|---|---|---|---|
| 4,882,491 A | * | 11/1989 | Tamura et al. ........... 250/338.3 |
| 5,600,143 A | | 2/1997 | Roberts et al. |
| 5,811,808 A | | 9/1998 | Cannata et al. |
| 6,028,309 A | | 2/2000 | Parrish et al. |
| 6,080,988 A | * | 6/2000 | Ishizuya et al. ......... 250/338.1 |
| 6,169,284 B1 | * | 1/2001 | Caputo et al. ........... 250/338.4 |
| 6,515,285 B1 | * | 2/2003 | Marshall et al. ............ 250/352 |

* cited by examiner

*Primary Examiner*—David Porta
*Assistant Examiner*—Davienne Monbleau
(74) *Attorney, Agent, or Firm*—Pearne & Gordon LLP

(57) ABSTRACT

A device for generating an image from an IR radiation including a plurality of polarized heat detectors (2) having specific electric resistances distributed over the focal plane of a detection module so as to deliver a signal representing a detected IR radiation. A read module (8) converts the electric signal into a signal usable by an image processing block (18). An electric signal compensation module (10) having a first branch (12) for obtaining a first thresholding to extract a first constant value signal due to the polarization of the heat detectors. The compensation module (10) includes a second branch (30) for obtaining a second thresholding to extract from the first thresholding signal a second low-level signal due to the dispersion of the electric resistances of the heat detectors and/or to the fluctuations in the temperature of the focal plane of the detection module.

19 Claims, 4 Drawing Sheets

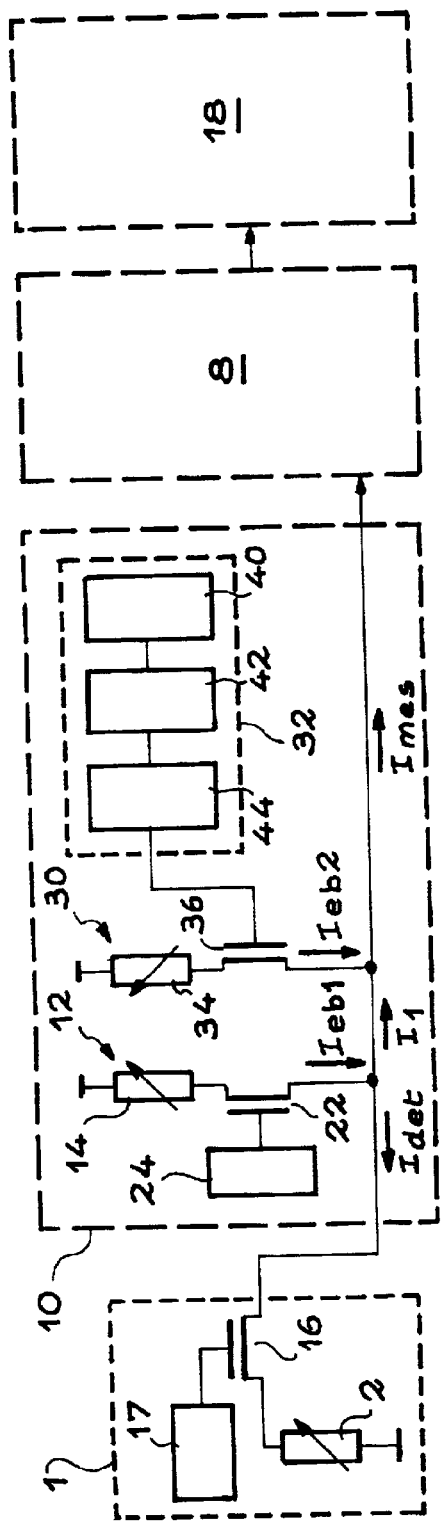
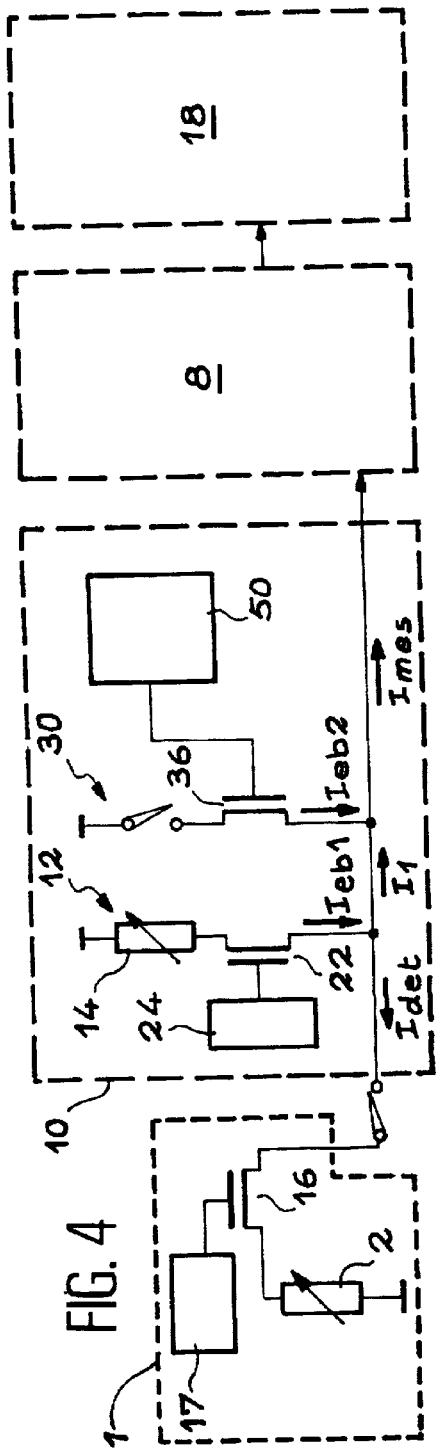
FIG. 3
FIG. 4

INFRARED RADIATION DETECTION DEVICE

BACKGROUND OF THE INVENTION

The invention is located in the field of the photo-detection of electromagnetic radiation by means of heat detectors, for example micro-bolometers, and concerns more particularly a device for generating an image from an IR radiation comprising a detection module including a plurality of heat detectors each having a specific electric resistance and being polarised so as to deliver the signal representing a detected IR radiation, a read module intended to convert said electric signal into a signal, for example a video signal, which can be used by an image processing block and a current signal compensation module comprising a first branch intended to extract from said electric signal a first current signal of polarisation having a constant value.

The invention also concerns a process for correcting an electric signal representing an IR radiation detected by a heat detector having a specific electric resistance, the process comprising a first stage allowing a first polarisation current signal having a constant value to be extracted from the electric signal.

FIG. 1 shows a heat detector constituted by a micro-bolometer 2 whose measurable characteristic quantity is the electric resistance. The micro-bolometer is constituted by an absorber 4 and by a thermometer 6. The assembly being separated from the read module 8 by a heat-insulating layer 9. At a pre-set temperature, for example the detector control temperature, the resistance of the micro-bolometer 2 is given by the law:

$$R = R_0 \exp\frac{-qE_a}{kT}$$

with $E_a$ the activation energy of the material (eV);
q the electron charge;
k the Boltzmann constant;
T absolute temperature.

The focal plane of the detection module generally comprises several micro-bolometers 2 which may be distributed either over a matrix with M lines and N columns for example in the standard television format to form a matrix detection device, or according to one line or one column to form a mono-directional detection module.

When a micro-bolometer 2 is lit up by radiation of sufficient IR energy, it undergoes heating proportionate to the quantity of radiation that it receives. This heating is translated by the variation in its resistance which is used to condition a current or an electric voltage by means of a read module 8.

A problem with detection devices of the prior art stems from the fact that the wanted signal, due to the temperature variations of the micro-bolometers, represents only about 0.5% of the total signal coming from the thermometer 6. Therefore, in order to amplify the signal needed for image formation, the amplifying chain of the read module 8 must have a large input dynamic. However, given the geometric dimensional constraints, it is difficult to make circuits reconciling a large input dynamic, a great gain, good linearity and low noise.

A known solution to circumvent this difficulty consists in amplifying only the part of the signal needed for image formation. To do this, a sizeable fraction of the signal delivered by the micro-bolometer 2 has to be eliminated, notably the current signal due to the polarisation of the detectors.

Furthermore, given that micro-bolometers are very sensitive to variations in the temperature of the focal plane of the detection module, it is necessary to use temperature control means to guarantee the stability of the output signals. The consequence of this is to increase the complexity and the cost of the detection module.

Another problem with known detection devices stems from the fact that micro-bolometers manufactured collectively have dispersed resistance values. So, for a given IR radiation, several micro-bolometers are saturated and deliver signals with fluctuations located outside the dynamic range of the read module 8 input stage.

Thus, to reduce the number of saturated micro-bolometers, it is appropriate to adapt specifically the response of each micro-bolometer so as to centre it in the dynamic of the read module 8 input stage.

FIG. 2 shows a diagram of a prior art device used to adapt the response of the micro-bolometer 2 to the dynamic of the read module 8 input stage. This device comprises a compensation module 10 in which a thresholding branch 12 allows the extraction of a constant part corresponding to the polarisation current signal of the electric current $I_{det}$ delivered by the micro-bolometer 2. To this end, the thresholding branch 12 comprises a passive micro-bolometer 14 generating a noise of the same analytic formulation as the noise of the active micro-bolometer 2 and having low heat resistance relative to the heat resistance of the active micro-bolometer 2. Therefore, its sensitivity to the scene is very low but its sensitivity to the temperature fluctuations of the focal plane is identical to that of the active micro-bolometer 2.

In the device shown in FIG. 2, the active micro-bolomater 2 is voltage biased and is coupled to the read module 8 input stage via an injection transistor 16 controlled by a first filtered voltage source 17. The thresholding branch 12 delivers for its part Ieb current via the first injection transistor 22 controlled by a filtered voltage source 24. The difference (Imes=Idet−Ieb) is processed by the read module 8, in which the current is converted into a voltage Vs by a current to voltage converter. The voltage Vs is then supplied to the image processing block 18 with a view to generating an image representing the picked up IR radiation. The passive micro-bolometer 14 is mounted in series with a first transistor 22 the conduction of which is controlled by a second filtered voltage source 24.

After extraction by the branch 12 of the polarisation signal, the resulting current $I_{mcs}$ further comprises dispersions due to the variations between the electric resistances of the micro-bolometers 2 distributed over the focal plane of the detection module 1. It is then desirable to carry out a thresholding adapted to each micro-bolometer in order to eliminate the excess or deficient current due to this dispersion of bolometric resistances.

An adapted thresholding makes it possible to reduce the fraction $$\frac{\text{measured} - \text{current}}{\text{detector} - \text{current}}$$

by authorising the subtraction of a current adapted to each micro-bolometer.

So, in order to implement an adapted thresholding, it is appropriate to use a digital system able to store values of coefficients $C_X(i, j)$ for the whole image and then to reassign these coefficients previously converted by a digital-to-analogue type conversion to the focal plane. The conversion of the digital data into analogue signals is a noise source operation and it is difficult to use digital-to-analogue converters currently available on the market without degrading excessively the noise of the heat detector when correction is envisaged over the polarisation signal in its entirety.

Furthermore, implementing an adapted thresholding necessitates a final or periodic reference taking.

For a final reference taking, a calibration procedure may be implemented during the manufacture of the detection module. This procedure comprises several phases:

a phase of acquisition of the analogue data of a uniform scene.

a phase of converting analogue data into digital data in order to be stored.

a phase of storing digital data.

Following this procedure, a memory is configured and will be the representation at a given temperature of the focal plane under consideration.

This procedure which has the advantage of being carried out once and for all, has however the following drawbacks:

each detector requires a specific initial calibration.

any long-term variation or drift will not be taken into account.

BRIEF SUMMARY OF THE INVENTION

The purpose of the invention is to overcome the drawbacks of the prior art mentioned above by means of a device of simplified design capable of providing a correction an adapted to each heat detector.

Another purpose of the invention is to reduce the sensitivity of the heat detectors to the temperature variations of the focal plane.

According to the invention, the compensation module comprises at least one second thresholding branch intended to extract from the electric signal delivered by a detector at least one second low amplitude signal due to the dispersion of the electric resistances of the heat detectors and/or to the fluctuations in the temperature of the focal plane of the detection module.

According to the invention, one of the first and second branches is dedicated to compensating for resistance dispersions and the other branch is dedicated to compensating for temperature fluctuations in the focal plane.

It is also possible to use a same branch to obtain both compensation types.

By means of the thresholding carried out by this second branch, the signal applied to the read module input has an amplitude which is appreciably reduced relative to the polarisation signal. The fact of having to correct only low currents due only to the dispersion of the electric resistances makes it possible to use conventional processing circuits, particularly conventional digital-to-analogue converters to generate digital values of the coefficients $C_X(i, j)$ without degrading excessively the heat detector noise.

Additionally, when the signal delivered by the detector is a current, these digital-to-analogue converters (DAC) may be integrated monolithically with the heat detectors.

The device according to the invention allows output to be improved during the manufacture of the heat detectors by reducing the number of saturated detectors. Indeed, the detectors, which originally had a response located outside the read module linear input range are no longer considered a priori as noncompliant.

The device according to the invention also makes it possible to increase the output sensitivity of the detection device and to improve the homogeneity of response on the image obtained.

According to the invention, the second branch is connected to a correction circuit intended to generate, for each heat detector, a specific setting allowing the extraction of said second signal to be controlled.

According to the invention, the second branch comprises a passive heat detector mounted in series with a first transistor the conduction of which is controlled by said specific setting.

According to the invention, the second branch comprises only a current source and a second transistor the conduction of which is controlled by said specific setting, this setting may be digital or analogue.

According to one embodiment, the second branch comprises two sub-branches, each sub-branch comprising a calibrated current source associated with a switching transistor which is controlled to advantage by a digital signal.

According to the invention, the passive heat detector of the second branch has a high resistance relative to the resistance of the passive micro-bolometer of the first branch.

According to the invention, each heat detector is constituted by one micro-bolometer.

The process according to the invention makes it possible to carry out a thresholding in two stages, a first stage making it possible to extract from the electric signal delivered by a heat detector a first signal of constant value due to the polarisation of this heat detector, and a second stage consisting in extracting from the electric signal a second signal, of low level relative to the first signal.

The process according to the invention comprises additionally a heat detector calibration phase comprising the following stages:

a) defocusing the scene;

b) storing the signal resulting from the previous stage;

c) using the stored signal to control the extraction of the low level signal depending on at least one characteristic intrinsic to the heat detector.

BRIEF DESCRIPTION OF THE DRAWINGS

Other characteristics and advantages of the invention will emerge from the following description, taken as a non-restrictive example, with reference to the appended figures wherein:

FIG. 3 shows diagrammatically and partially a first embodiment of a detection device according to the invention, FIG. 4 shows diagrammatically and partially a second embodiment of a detection device according to the invention.

DETAILED DESCRIPTION OF THE INVENTION

In the following description, the elements fulfilling the same function in the prior art device and in the device according to the invention will be denoted by identical references. Furthermore, in order to simplify the illustration of the invention, a single heat detector has been shown in FIGS. 1 to 7.

Figure 1:
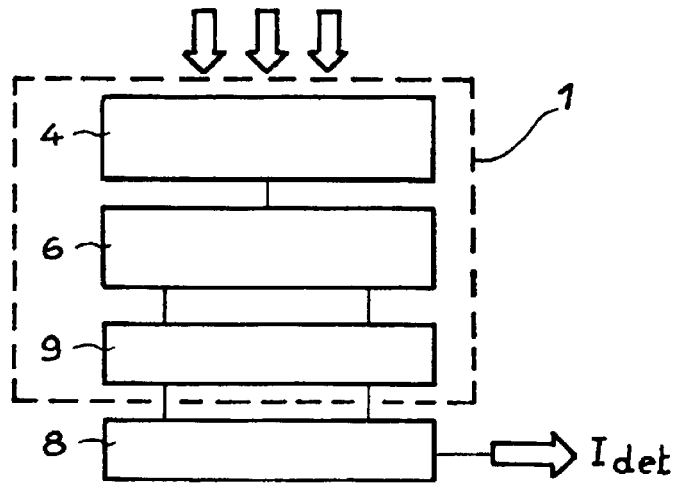
FIG. 1 shows a block diagram of a micro-bolometer used in a device according to the invention.

FIG. 1 described previously shows diagrammatically a micro-bolometer 2 which may be made monolithically with the read module 8, or added onto the latter by means of an adapted process, for example micro-spheres, in the case of a hybridised detection plane.

Figure 2:
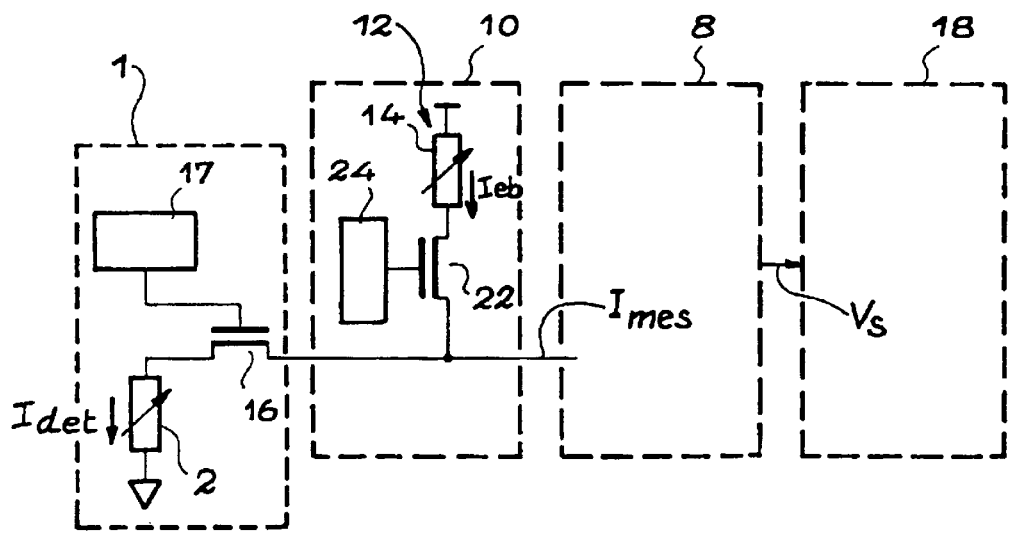
FIG. 2 shows a block diagram of a prior art device.

FIG. 2 has been previously described and shows diagrammatically a compensation module 10 in a prior art device.

FIG. 3 shows a device according to the invention in which the detection module 1 comprises a micro-bolometer 2 voltage biased so as to deliver a current $I_{det}$ representing a detected IR radiation. To prevent the micro-bolometer 2 heating up, the micro-bolometer 2 is polarised according to a pulsed mode. The current $I_{det}$ is supplied to a signal compensation module 10 comprising a first branch 12 allowing a first thresholding to be carried out in order to extract from said signal $I_{det}$ a first signal of constant value approximately equal to 90% of the polarisation current of the micro-bolometer 2.

The first thresholding branch 12 comprises a first passive micro-bolometer 14 in series with a first conduction control transistor 22 controlled by a filtered power supply 24. This first branch 12 makes it possible to subtract a current $I_{eb1}$ from the current $I_{det}$ delivered by the active micro-bolometer 2. The value of the current $I_{eb1}$ is previously calculated as a function of the resistance $R_b$ of the active micro-bolometer 2 and of the resistance $R_{comp1}$ of the first passive micro-bolometer 14. The control voltage of the first transistor 22 is calculated in such a way that the current circulating in the first branch 12 is equal to $I_{eb1}$. The current $I_1$ resulting from the subtraction of the current $I_{eb1}$ represents approximately 10% of the polarisation current of the active micro-bolometer 2.

The compensation module 10 additionally comprises a second branch 30 making it possible to carry out a second thresholding intended to extract from the electric signal $I_1$, resulting from the first thresholding a second signal $I_{eb2}$ of low level relative to $I_{eb1}$, and due to the dispersion of the electric resistances of the heat detectors and/or to the fluctuations in the temperature of the focal plane of the detection module 1.

Said second branch 30 is connected to a correction circuit 32 intended to generate, for each heat detector 2, a specific setting allowing the extraction of said second signal $I_{eb2}$ to be controlled.

The second thresholding branch 30 comprises a second passive micro-bolometer 34 having a high resistance $R_{comp2}$ relative to the resistance of the first passive micro-bolometer 14. The value of the current $I_{eb2}$ extracted by this second branch 30 is proportionate to the reverse of the value of the resistance $R_{comp2}$ and is regulated by a second transistor 36 the conduction of which is controlled by a voltage $V_{eb2}$ delivered by the correction circuit 32. This voltage $V_{eb2}$ is calculated as a function of the resistance $R_b$ of the active micro-bolometer 2 and of the resistance $R_{comp2}$ of the second passive micro-bolometer 34 in such a way that the current circulating in the second branch 30 is equal to $I_{eb2}$.

The correction circuit 32 comprises a generator 40 intended to provide a digital setting $C_X(i,j)$ representing the voltage $V_{eb2}$ and a digital-to-analogue converter 42 intended to convert the digital setting into an analogue control signal of the second transistor 36.

An attenuation module 44 of the voltage $V_{eb2}$ is provided upstream of the second transistor 36 in order to reduce the noise introduced by the digital-to-analogue converter 42.

For a matrix detection module, the second thresholding is carried out by a digital setting $C_X(i,j)$ previously stored in an external memory and calculated specifically for each micro-bolometer 2.

FIG. 4 shows a second embodiment in which the second thresholding branch 30 comprises only a second transistor 36 controlled directly by a generator 50 able to deliver a DC analogue voltage. This voltage is applied to the second transistor 36 to regulate the current $I_{eb2}$.

As in the first embodiment, the current $I_{eb2}$ in the second branch 30 is calculated in such a way that the dynamic of the current $I_{mes}$ is located in the dynamic of the read module 8 input stage.

Figure 5:
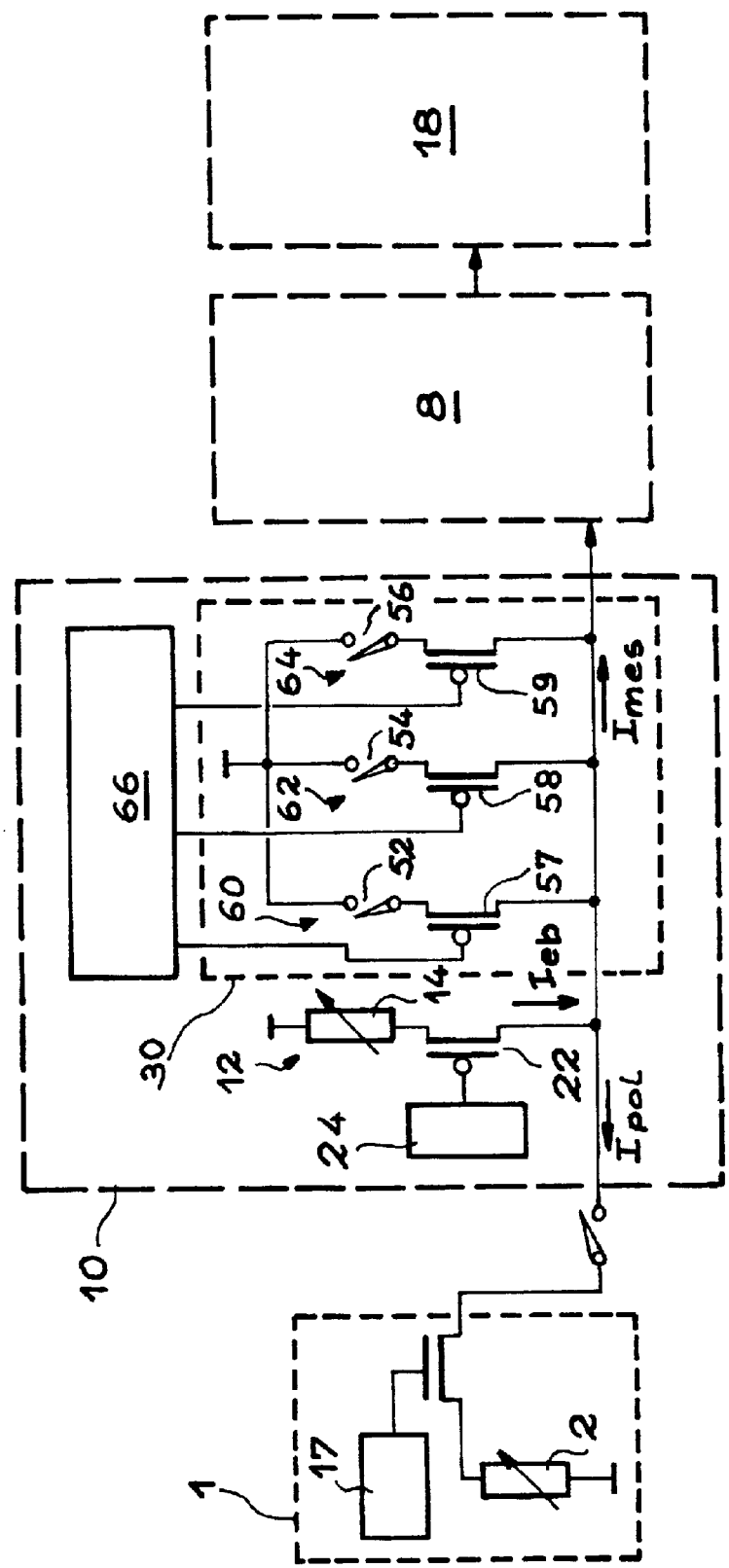
FIG. 5 shows diagrammatically and partially a third embodiment of a detection device according to the invention.

FIG. 5 shows a third embodiment of the invention in which the second branch 30 comprises three sub-branches 52, 54 and 56 mounted in parallel, each sub-branch being able to conduct a pre-set current. The value of the current in each of the sub-branches 52, 54 and 56 is fixed by a transistor 57, 58 and 59 respectively in saturation regime provided in series with the corresponding sub-branch. A saturation regime transistor being an electrical equivalent to a current source.

The principle still consists in subtracting a thresholding current in at least two branches. The first branch makes it possible to subtract a constant current $I_{eb2}$ and the second branch makes it possible to subtract a current $I_{eb2}$ adapted to each detector and calculated as a function, on the one hand of its specific bolometric resistance, and on the other hand of the temperature of the focal plane. Each sub-branch 52, 54 and 56 allows a different current to be extracted representing a fraction of the current $I_{eb2}$. Conduction in each of the branches 52, 54 and 56 is enabled by the switches 60, 62 and 64 respectively. The selection of a sub-branch is made by logic signals provided by a programmable unit 66, which selectively control the switches 60, 62 and 64. These logic signals may be loaded by an appropriate register from outside the circuit. Clearly the second branch 30 may comprise a number N of sub-branches which may easily be modified according to the value of the current $I_{eb2}$ to be extracted.

In operation, to the sub-branch 52 is assigned an elementary current $I_{eb}$ representing a least significant bit, an intermediate order current $2 \times I_{eb}$ for the sub-branch 54, and a high order current $4 \times I_{eb}$ for the sub-branch 56. The compensation module 10 may then be configured to subtract currents going from 0 to $7 \times I_{eb}$, that is 8 different current levels.

Figure 6:
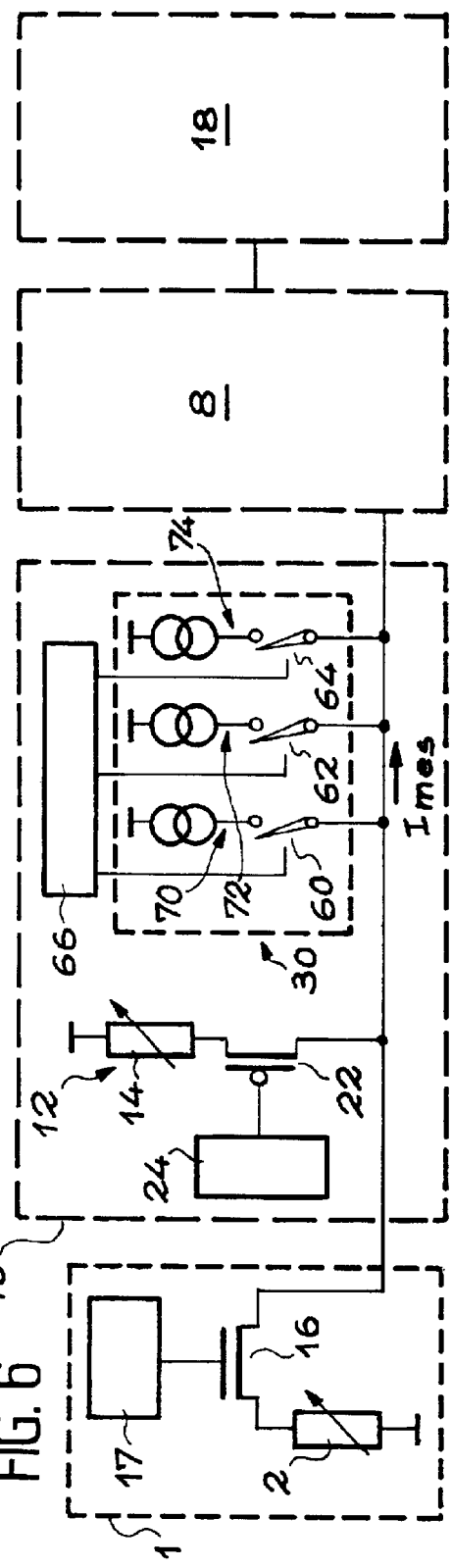
FIG. 6 shows diagrammatically and partially a device allowing a calibration to be made of a heat detector according to the invention.

FIG. 6 shows an embodiment of the invention in which the second branch 30 comprises several sub-branches 70, 72, 74. Each sub-branch is connected to a current generator respectively calibrated 76, 78, 80 made for example monolithically in the circuit. Selection of a sub-branch is made by logic signals provided by a programmable logic unit 66, which selectively controls the switches 60, 62 and 64. The logic signals may be loaded by an appropriate register from outside the circuit or an apprenticeship register in the circuit.

Figure 7:
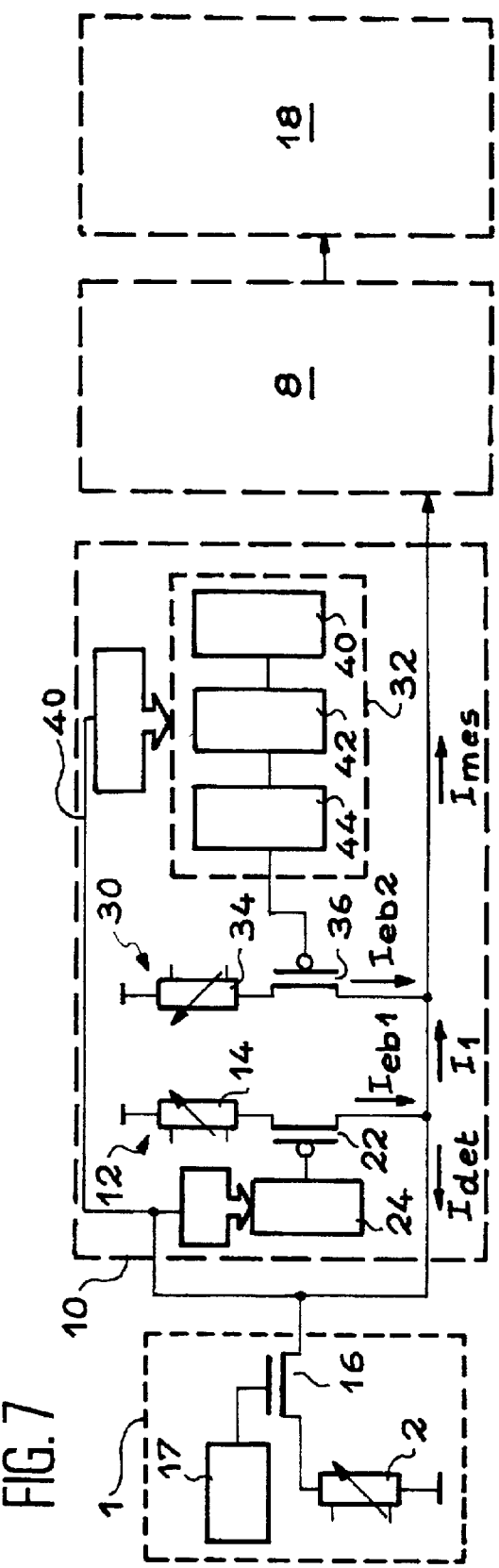
FIG. 7 shows diagrammatically and partially a device for compensating for the temperature fluctuations of the focal plane of a detection device according to the invention.

FIG. 7 shows a compensation device in which each thresholding branch includes a passive compensation micro-bolometer 14, 34 respectively and where a feedback loop 40 makes it possible to re-inject a measurement of the temperature of the focal plane into each of the thresholding branches 12, 34 so as to modulate the currents to be extracted as a function of the temperature of the focal plane. This allows the sensitivity of the detector to fluctuations in the temperature of the focal plane to be reduced.

Thus, the device according to the invention makes it possible to increase the output sensitivity of heat detectors without introducing additional noises.

What is claimed is:

1. A device for generating an image from an IR radiation comprising a detection module (1) including a plurality of heat detectors (2) each having a specific electric resistance and being polarised so as to deliver a signal representing a detected IR radiation, said device comprising a read module (8) intended to convert said electric signal into a signal which can be used by an image processing block (18) and an electric signal compensation module (10) comprising a first branch (12) making it possible to carry out a first thresholding intended to extract from said electric signal a first constant value signal due to the polarisation of the heat detectors (1), a device characterised in that the compensation module (10) comprises at least one second branch (30) making it possible to carry out a second thresholding intended to extract from the electric signal resulting from the first thresholding at least one second low-level signal due to the dispersion of the electric resistances of the heat detectors and/or to the fluctuations in the temperature of the focal plane of the detection module.

2. A device according to claim 1, characterised in that said second branch (30) is connected to a correction circuit (32) intended to generate, for each heat detector, a specific setting allowing the extraction of said second signal to be controlled.

3. A device according to one of claims 1 or 2, characterised in that the second branch (30) comprises a passive heat detector (34) mounted in series with a second transistor (36) the conduction of which is controlled by said specific setting.

4. A device according to claim 2, characterised in that the second branch (30) comprises only a current source and a first control transistor (36) the conduction of which is controlled by said specific setting.

5. A device according to claim 4, characterised in that the correction circuit (32) comprises a DC voltage generator (50) intended to supply a DC analogue voltage allowing the current in said second branch (30) to be regulated.

6. A device according to claim 5, characterised in that the compensation block (10) comprises a control loop making it possible to re-inject into each of the thresholding branches (12), (30) a measurement of the temperature of the focal plane of the detection module (1) so as to modulate the values of the signals extracted by the first branch (12) and the second branch (30) as a function of the temperature of the focal plane of detection.

7. A device according to claim 6, characterised in that the active micro-bolometers (2) are distributed over the focal plane of the detection device in M lines and N columns.

8. A device according to claim 3, characterised in that the second passive micro-bolometer (34) of the second branch (34) has a high resistance relative to the resistance of the first passive micro-bolometer (14) of the first one (12).

9. A device according to claim 3, characterised in that the correction circuit (32) comprises a generator (40) intended to provide a digital setting, a digital-to-analogue converter (42) intended to convert said digital setting into analogue voltage so as to control the second transistor (36).

10. A device according to claim 9, characterised in that the correction circuit (32) additionally comprises an attenuation module (44).

11. A device according to claim 9, characterised in that the digital-to-analogue converter (42) is integrated monolithically with the micro-bolometer (2).

12. A device according to claim 1, characterised in that the second branch (30) comprises a plurality of subbranches (52, 54, 56) mounted in parallel, each sub-branch being able to conduct a pre-set current.

13. A device according to claim 1, characterised in that the first branch (12) comprises a passive heat detector (14) provided in series with a first control transistor (22) the conduction of which is controlled by a constant voltage.

14. A device according to claim 13, characterised in that each heat detector (2) is constituted by a micro-bolometer.

15. A device according to claim 1, characterised in that one of the first and second branches (12, 30) is dedicated to compensating for resistance dispersions and the other branch is dedicated to compensating for temperature fluctuations in the focal plane.

16. A device according to claim 15, characterised in that the second branch (30) comprises two sub-branches, each sub-branch including a balanced current source associated with a switching transistor controlled by a digital signal.

17. A process for correcting an electric signal representing an IR radiation detected by a heat detector (2) having a specific electric resistance, said process comprising a first stage allowing a first polarisation signal having a constant value to be extracted from the electric signal, a process characterised in that it comprises a second stage consisting in extracting from the electric signal a second signal, of low level relative to the first signal.

18. A process according to claim 17, characterised in that it comprises a stage consisting in generating a specific setting allowing the extraction of said second signal to be controlled.

19. A process according to claim 18, characterised in that it comprises a heat detector (2) calibration phase comprising the following stages:

a) defocusing the scene;

b) storing the signal resulting from the previous stage;

c) using the stored signal to control the extraction of the low level signal.

* * * * *

UNITED STATES PATENT AND TRADEMARK OFFICE
CERTIFICATE OF CORRECTION

PATENT NO. : 6,791,085 B2
APPLICATION NO. : 09/995051
DATED : September 14, 2004
INVENTOR(S) : Jean-Luc Martin et al.

It is certified that error appears in the above-identified patent and that said Letters Patent is hereby corrected as shown below:

Column 6
Line 32, pleae delete "$I_{eb2}$" and insert therefor --$I_{eb1}$--.

Signed and Sealed this

Twenty-eighth Day of November, 2006

JON W. DUDAS
*Director of the United States Patent and Trademark Office*